J. C. ARMOR.
LIGHTNING ARRESTER.
APPLICATION FILED JUNE 13, 1916.
1,307,995.
Patented June 24, 1919.
2 SHEETS—SHEET 1.
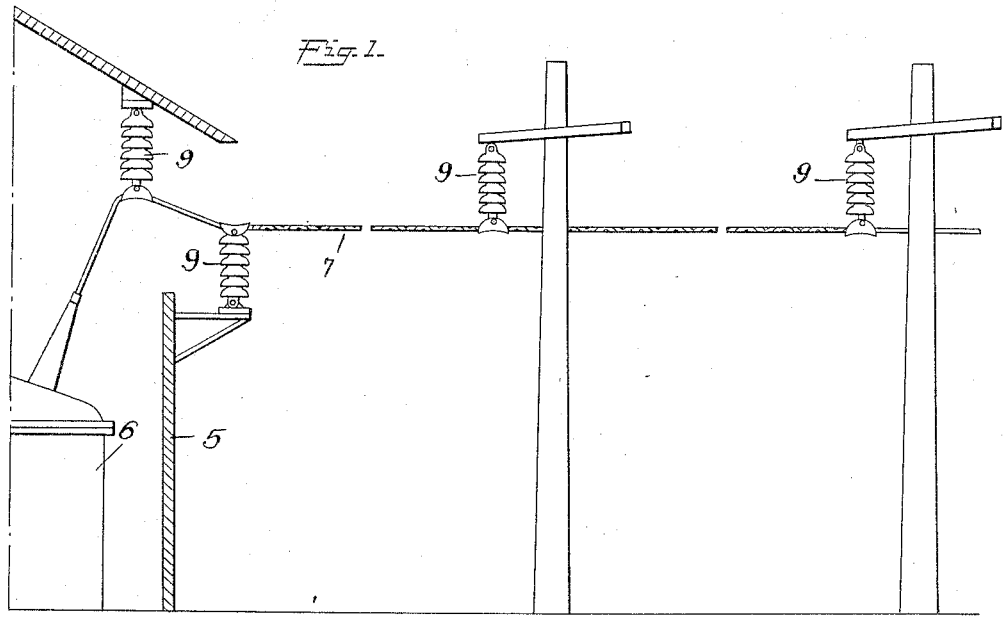
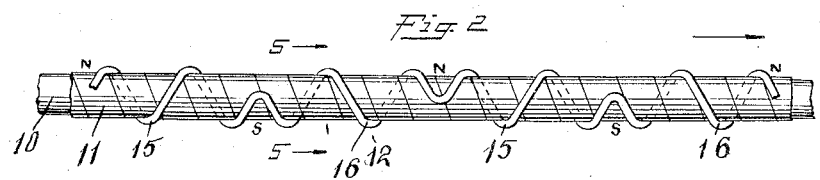
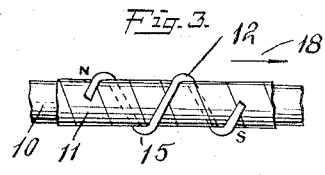
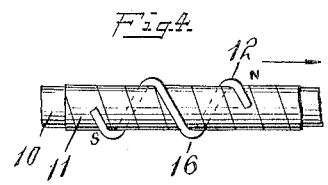
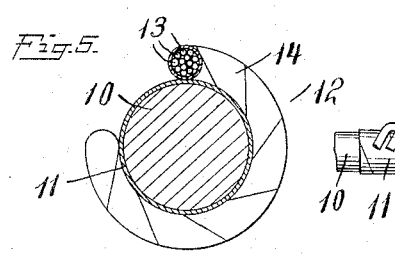
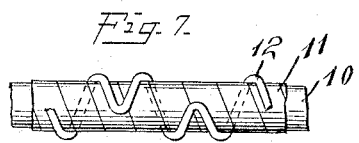
Inventor
James C. Armor
By his Attorney

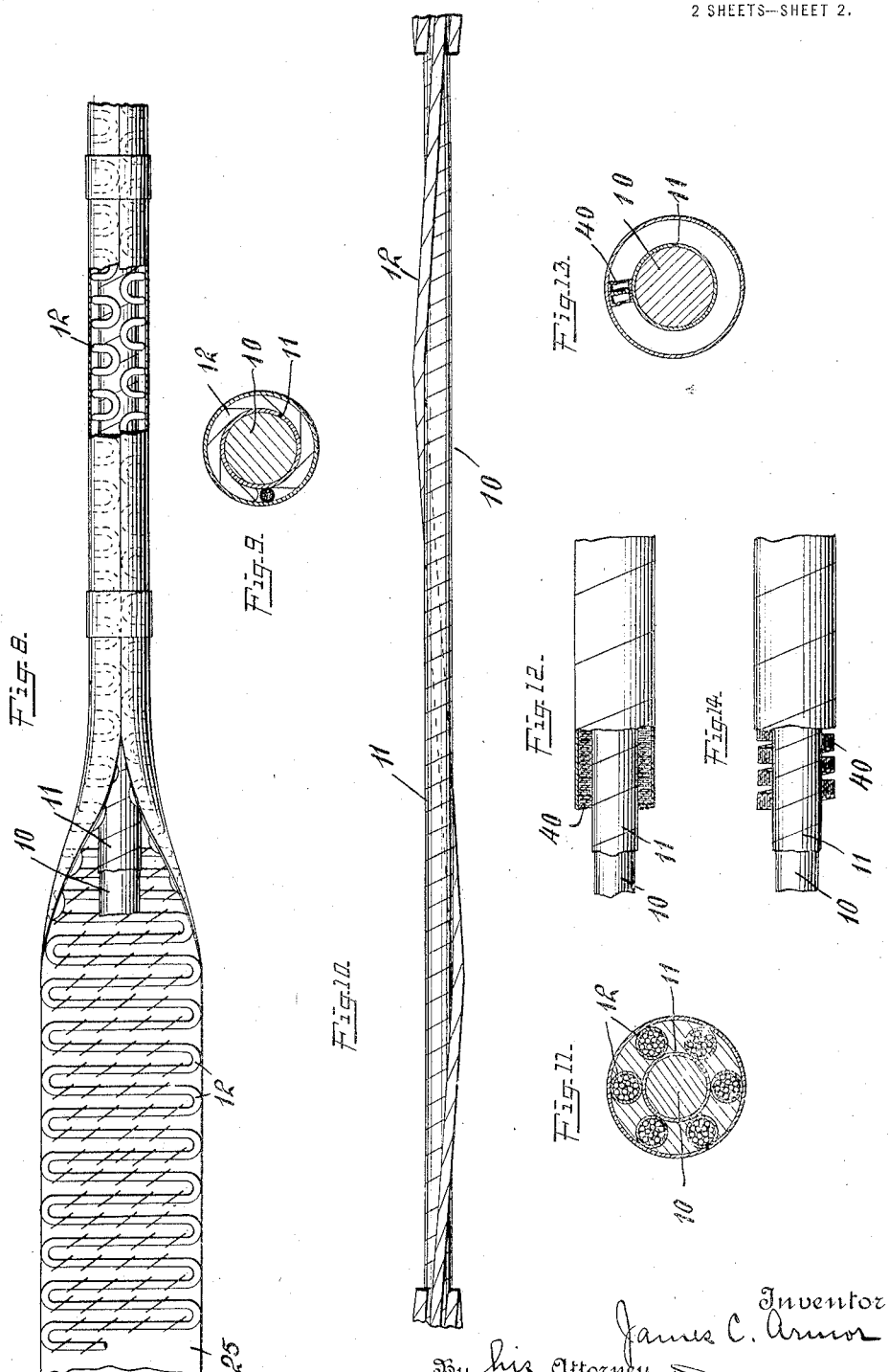

UNITED STATES PATENT OFFICE.

JAMES C. ARMOR, OF PITTSFIELD, MASSACHUSETTS.

LIGHTNING-ARRESTER.

1,307,995.        Specification of Letters Patent.      Patented June 24, 1919.

Continuation in part of application Serial No. 681,136, filed March 2, 1912. This application filed June 13, 1916. Serial No. 103,361.

*To all whom it may concern:*

Be it known that I, JAMES C. ARMOR, a citizen of the United States, and a resident of Pittsfield, county of Berkshire, and State of Massachusetts, have invented certain new and useful Improvements in Lightning-Arresters, of which the following is a specification, reference being had to the accompanying drawings, forming a part thereof.

My invention relates to the protection of electric apparatus against lightning and other high frequency electrostatic charges and disturbances.

One object of my invention is to provide a lightning arrester which shall be associated and coextensive with an electric line conductor and adapted to protect the electric apparatus to which the line is connected.

Another object is to provide an electric power transmission conductor which shall structurally embody a distributed lightning arrester adapted to dissipate the energy of high frequency disturbances in the form of heat.

Another object is to provide a transmission conductor of the character above indicated that shall not only effectively serve as a lightning arrester but which shall nevertheless have no material effect when the conductor is traversed only by normal working current.

The necessity of protecting electrical apparatus from electrostatic disturbances is of course well recognized and large and expensive lightning arresters have been considered an essential part of the equipment of high voltage generating or receiving stations.

I am aware that the use of choke coils located at suitable intervals in a transmission circuit and forming a part of the circuit, have been proposed for the purpose of lightning protection. Furthermore, I am aware that electric transmission conductors have been proposed which are structurally formed with a view to producing a predetermined reactance under commercial or normal conditions, in order to neutralize the capacity reactance of a cable for example, but so far as I am aware a conductor which is suitable for the transmission of material quantities of electric energy and which at the same time is constructed to embody a distributed lightning arrester which offers a very high inductive resistance to high frequency discharges without having any material effect at ordinary commercial frequencies, has never been proposed prior to my copending application Serial No. 681,136 filed March 2, 1912, of which this application is a continuation in part.

In order that my invention may be thoroughly understood I will now proceed to describe the same in the following specification and then point out the novel features thereof in appended claims.

Referring to the drawings:

Figure 1 is a diagram illustrating the way in which my invention is employed.

Fig. 2 is a partially sectional elevation of a short length of a conductor arranged and constructed in accordance with my invention and constituting an embodiment thereof.

Figs. 3 and 4 are views showing adjacent sections of the conductor of Fig. 2 and indicating the effect and action of the protective wires.

Fig. 5 is a transverse section of the conductor of the previous figures, drawn to a larger scale.

Figs. 6, 7 and 8 are views corresponding to Fig. 2, of modified structures which also embody my invention.

Fig. 9 is a transverse section of the structure of Fig. 8.

Other modifications of my invention are illustrated in Figs. 10, 12 and 14 which are partially sectional elevations, and Figs. 11 and 13 are enlarged sections of the respective conductors illustrated in Figs. 10 and 12.

Referring first to Figs. 1 to 5 inclusive,— 5 designates an electric power plant or station containing a transformer 6, or other electric apparatus to which an electric power transmission line 7 is connected. The line may be supported from suitable fixtures by insulators 9. 10 represents a conductor which may, for example, be a copper wire and forms the body of the transmission line 7. It has an insulating covering 11 and wound upon it is a lightning arrester 12 which, in the structure here shown, comprises a bundle of small iron wires 13 which are insulated from each other by means of black oxid, varnish, or other suitable coating, and are held together by an outer layer of insulation 14 which may consist of a braided jacket or the like.

I prefer to galvanize each iron wire or coat it with copper in order to make it weather-proof, and to improve its effect by increasing the eddy current loss.

The protective member of the figures under discussion consists of a plurality of oppositely wound coil sections 15 and 16, which are respectively and individually shown in Figs. 3 and 4, but are shown joined into a continuous whole constituting the protective member in Fig. 2. Considering the coil 15 independently as shown in Fig. 3, the action of the magnetic coil, when current traverses the conductor in the direction of the arrow 18, for example, is substantially the same as if the bundle of iron wires constituted the core upon which the conductor is wound. The core being comparatively short, the magnetic circuit is through the core and back through the air, practically all of the reluctance being in the air path and being sufficiently high to prevent the saturation of the core.

On the other hand, if the coil is wound for a considerable length on the core, the core will be saturated if the pitch of the coil is relatively short as in Fig. 2, for example, when a current of approximately 20 amperes traverses the conductor. It is therefore necessary if the continuous coil winding is to be utilized to employ a long pitch so that there are very few turns to a considerable distance. Such an arrangement is illustrated in Fig. 10. It will however, be apparent from the foregoing discussion that if it is desired to introduce a large amount of reactance to the flow of high frequency currents, relative to the weight of the iron and to the length of the conductor, it is preferable to have the pitch shorter.

The arrangement of Fig. 2 acts the same as a plurality of independent coils which are relatively short since each alternate coil is wound oppositely, but nevertheless the winding is continuous and a consequent pole arrangement results, as clearly indicated by the reference letters N and S. Such an arrangement will not saturate although the pitch of the individual turns is short and the inductance is high relative to the weight. Each turn is evidently lighter than in the long pitch arrangement of Fig. 10.

I propose to utilize either a single bundle of wires wound as in Fig. 2, or a plurality of bundles wound as shown in Fig. 6.

It is of course not essential that there be one or more complete turns constituting each individual coil section and in Fig. 7 I have shown an arrangement in which there is one turn in one direction and the next turn in the opposite direction.

There is another modification of my invention shown in Fig. 8 which possesses many advantages over any of the others, in that it can be applied to a conductor which is already in service. This comprises a supporting ribbon such as a wide tape 25 of insulation, upon which one or more bundles of iron wires are wrapped in zigzag form. The wires may be held in place in any suitable manner,—for example they may be stitched to the fabric so that the covering constitutes an article of manufacture capable of being applied to an ordinary conductor. It is applied to the conductor by wrapping it upon it as shown to the right in Fig. 8 and in Fig. 9. This arrangement in its effect is similar to that of Fig. 7 and comprises oppositely wound alternate turns.

While I believe the proportioning of the conductors of Figs. 2 to 10 inclusive are such as are well adapted to constitute sections of a power transmitting circuit which may for example transmit a current of a hundred amperes and upward at high voltages, the use of iron or other magnetizable material is not essential to my invention and some other conductor may be employed. For example, as shown in Figs. 12 and 13, an insulated ribbon 40 of aluminum or some other conducting material may be wrapped upon the conductor 10 in a relatively close helix. The eddy current losses in this structure are alone depended upon instead of both the hysteresis and eddy current losses, as when iron is used. When an aluminum or other non-magnetizable conductor is employed, the pitch of the coil may be relatively short without having any material effect under normal working currents, although the line conductor may transmit a large power.

The aluminum conductors instead of being arranged in a simple helix, may comprise a plurality of conductors wound in parallel as shown in Fig. 13.

Attention is particularly directed to the fact that my improved conductor consists essentially of two elements, a conducting or current-carrying element and a protective element which is not for the protection of the conductor but for the protection of generating or receiving station apparatus to which the conductor is connected. It is my intention to utilize a required length, say 500 or 1000 feet of line conductor, which is equipped with or embodies the lightning arrester of my invention, at the station ends of a circuit as directed in Fig. 1, and by this means avoids the necessity of utilizing lightning arresters of the usual kind which occupy very material space in the stations and are expensive to construct.

It will be understood that variations in form and arrangement of parts may be effected within the spirit and scope of my invention, and I intend that only such limitations be imposed as are indicated in appended claims.

What I claim is:

1. The combination of a low frequency electric power conductor, and means for dissipating energy, due to high frequency disturbances, by heat resulting from hysteresis and eddy currents comprising a substantially coextensive distributed conductor having a plurality of turns of metal close to and insulated from the power conductor, said metal turns constituting an open coil whereby said means has no material influence when the power conductor is traversed only by a normal working current.

2. The combination of a low frequency electric power conductor, and means for dissipating energy, due to high frequency disturbances, by heat resulting from hysteresis and eddy currents comprising a plurality of turns of independently insulated iron wires wound on the power conductor and constituting an open coil substantially coextensive therewith whereby said means will have no material influence when the power conductor is traversed only by a normal working current.

3. In combination with an electric line conductor, a lightning arrester coextensive with the line conductor and comprising a coil of conducting material wound on the line conductor and having oppositely wound alternate groups of turns.

4. In combination with an electric circuit conductor, a lightning arrester coextensive with the line conductor and comprising a coil of magnetizable material having oppositely wound alternate groups of turns.

5. In combination with an electric circuit conductor, a lightning arrester coextensive with the line conductor and comprising a coil wound thereon and consisting of a plurality of strands of iron wire having oppositely wound alternate groups of turns.

6. In combination with an electric circuit conductor, a lightning arrester comprising a coil substantially coextensive with the line conductor and wound thereon, which consists of a plurality of strands of iron wire having oppositely wound alternate groups of turns, and means for insulating the iron wires from each other and from the conductor.

7. A lightning arrester sheath for electric current conductors comprising a continuous magnetizable member of zigzag form adapted to be bent about the conductor into a cylindrical form coextensive with the conductor and with a longitudinal axis coincident with the axis of the conductor.

8. A lightning arrester sheath for electric current conductors comprising a tape or ribbon of insulation, and a magnetizable member of zigzag form secured to the tape or ribbon of insulation and adapted to be bent about the conductor into a cylindrical form coextensive with the conductor and with a longitudinal axis substantially coincident with the axis of the conductor.

In witness whereof, I have hereunto set my hand this 10th day of June, 1916.

JAMES C. ARMOR.

In presence of—
EDWARD T. SCULLY.